United States Patent
Detwiler et al.

(10) Patent No.: US 6,846,026 B2
(45) Date of Patent: Jan. 25, 2005

(54) VEHICLE PEDESTRIAN SAFETY BUMPER SYSTEM

(75) Inventors: Duane Detwiler, Powell, OH (US); Skye Malcolm, Columbus, OH (US); Steve Mark, Columbus, OH (US); Douglas Longhitano, Upper Arlington, OH (US); Ryan Miller, Columbus, OH (US); Christopher Mampe, Delaware, OH (US); Christos Agouridis, Columbus, OH (US); Akihiro Shibuya, Tochigi (JP); David Burge, Marysville, OH (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/084,616

(22) Filed: Feb. 28, 2002

(65) Prior Publication Data

US 2003/0168869 A1 Sep. 11, 2003

(51) Int. Cl.⁷ .......................... B60R 19/02; B60R 19/18
(52) U.S. Cl. ................... 293/102; 293/132; 296/187.03
(58) Field of Search ................................ 293/102, 103, 293/117, 132; 296/187.01, 187.03, 187.04, 187.08, 188, 189, 197.01

(56) References Cited

U.S. PATENT DOCUMENTS

| | | | |
|---|---|---|---|
| 4,090,728 A | | 5/1978 | Riedel |
| 4,422,680 A | * | 12/1983 | Goupy ........................ 293/122 |
| 4,431,221 A | * | 2/1984 | Jahnle ........................ 293/122 |
| 4,440,429 A | * | 4/1984 | Eyb ............................ 293/120 |
| 5,100,189 A | * | 3/1992 | Futamata et al. ............ 293/132 |
| 5,378,031 A | * | 1/1995 | Ohno et al. ................. 293/102 |
| 5,441,319 A | * | 8/1995 | Oyama et al. .............. 293/102 |
| 5,803,514 A | * | 9/1998 | Shibuya et al. ............. 293/132 |
| 5,876,077 A | * | 3/1999 | Miskech et al. ............ 293/132 |
| 6,042,163 A | * | 3/2000 | Reiffer ....................... 293/155 |
| 6,179,355 B1 | * | 1/2001 | Chou et al. ................. 293/132 |
| 6,315,338 B1 | * | 11/2001 | Schneider et al. .......... 293/102 |
| 6,318,775 B1 | * | 11/2001 | Heatherington et al. .... 293/120 |
| 6,398,275 B1 | * | 6/2002 | Hartel et al. ................ 293/102 |
| 6,644,699 B2 | * | 11/2003 | Anderson et al. ........... 293/102 |
| 6,659,518 B2 | * | 12/2003 | Ponsonnaille et al. ...... 293/102 |
| 2001/0013705 A1 | * | 8/2001 | Okamura et al. ........... 293/102 |
| 2002/0101086 A1 | | 8/2002 | Koch et al. |
| 2003/0075951 A1 | * | 4/2003 | Hanakawa et al. ......... 296/188 |

FOREIGN PATENT DOCUMENTS

| | | |
|---|---|---|
| DE | 196 11 934 C1 | 4/1997 |
| DE | 29622715 * | 4/1997 |
| EP | 1 103 428 A2 | 5/2001 |
| EP | 1 199 224 A1 | 4/2002 |
| WO | WO 02/09980 A2 | 2/2002 |

OTHER PUBLICATIONS

EEVC European Enhanced Vehicle–Safety Committee; EEVC Working Group 17 Report; Improved Test Methods to Evaluate Pedestrian Protection Afforded by Passenger Cars; Dec. 1998.

* cited by examiner

Primary Examiner—D. Glenn Dayoan
Assistant Examiner—H. Gutman
(74) Attorney, Agent, or Firm—Arent Fox PLLC; Mark E. Duell, Esq.

(57) ABSTRACT

An impact reduction vehicle bumper system for a vehicle has a pedestrian safety plate, which is connected to a steel bumper beam and occupies the region between a pair of frame rails that are disposed on the front of the vehicle. The bumper beam is connected to side brackets, which are bolted to the vehicle frame rails. Frame rail extensions are located in front of the frame rails and are welded to the side brackets.

27 Claims, 5 Drawing Sheets

VEHICLE PEDESTRIAN SAFETY BUMPER SYSTEM

BACKGROUND OF THE INVENTION

1. Field of the Invention

The present invention relates to a front bumper system for a vehicle, which meets the conflicting requirements for both pedestrian safety and 5 mph impact performance.

2. Background

In the past decade, there have been a multitude of advancements for motor vehicle safety. From dual stage airbags and load limiting seatbelts to side airbags and head curtains, occupants of motor vehicles have never been more protected. However, pedestrians still have the same risks they have faced for years.

Automobiles are designed with the safety of their occupants in mind. The increasingly stronger structures that protect these occupants in high-speed frontal crashes however, have devastating effects when the object that is struck is an unprotected pedestrian. In the United States alone in 1997, there were 5,307 fatalities and some 77,000 injuries of pedestrians. Although pedestrian accidents only account for 2.4 percent of all automotive accidents in the U.S., they account for 12.6 percent of all automotive fatalities. In addition to the 5,000 annual fatalities in the U.S., there were over 3,000 in Japan, 7,000 in the European Union, and 19,000 in China.

In order to address this global problem, the European Enhanced Vehicle-Safety Committee (EEVC) working group established test procedures for evaluating the safety performance of motor vehicles with respect to pedestrians. These procedures include the evaluation of bumper systems.

For some off-road and multi-purpose vehicles, an "alternative upper legform impactor test" is used to evaluate the front bumper system. This test propels an upper legform impactor into a stationary vehicle at a high velocity of 40 km/h. Acceptance criteria are based on peak loads and bending moments measured on the impactor. "Alternative upper legform tests" of standard Sport Utility Vehicles' (SUVs') front bumper systems may reveal a very high peak force of 26 kN and a very high peak moment of 1686 Nm. Generally, substantial "soft" crush space is required for good performance. In addition, a series of low speed barrier impact tests are conducted to evaluate vehicle repair costs. This includes frontal impact tests conducted at 5 mph on both flat and 30° angled barriers. Limiting the amount of barrier intrusion into the bumper for the 5 mph flat and angled barrier impacts minimizes repair costs. The low speed barrier testing for a standard SUV bumper system allows an intrusion of 110 mm for the flat barrier test and an intrusion of 90 mm for the angled barrier test.

In order to improve the safety of pedestrians, while conforming to the requirements for bumper impact performance, the inventors of the present invention have developed the vehicle pedestrian safety bumper system that can be used on various types of vehicles including a sport utility vehicle as well as have an excellent 5 mph impact performance.

BRIEF SUMMARY OF THE INVENTION

The present invention has been accomplished with the above circumstances in view, and provides a front bumper for a vehicle, for example an SUV, that meets the conflicting requirements of pedestrian safety and low speed impact performance. Specifically, the vehicle pedestrian safety bumper system is an impact reduction system for a vehicle that reduces a force upon impact with an object. The system comprises at least two frame rails mounted on the vehicle body and at least two brackets coupled to the frame rails. A beam is attached to the brackets and a plate member is coupled to the beam. At least two frame rail extensions are coupled to the brackets.

In the preferred embodiment of the present invention, a pair of frame rail sections is mounted onto the front of an SUV body below the hood in the bumper area. A pair of high strength steel side brackets is bolted to the frame rail sections and a high strength steel beam is in turn welded to the side brackets. The plate member is a pedestrian safety plate that is welded to the high strength steel beam, and occupies the region between the frame rails. In front of the frame rails are a pair of three-part frame rail extensions. The frame rail extensions are welded to the side brackets.

With the above arrangement, the performance of the vehicle pedestrian safety bumper system having a pedestrian safety plate, meets the requirements for an "alternative upper legform impactor to bumper test". The alternative upper legform test is used to measure the force and moment on a simulated pedestrian leg when a vehicle's bumper system is more than 500 mm off of the ground. The upper legform impactor is launched horizontally at 40 km/h toward the bumper and the peak force and peak moment are measured. Targets for a pedestrian safe bumper system were set at a target peak force of less than 7.5 kN and a target peak moment of less than 510 Nm. As a result, the arrangement of the present invention provides a 79% reduction in the peak force measured on the legform over a standard bumper as well as a 1.58 kg mass reduction compared to a base line standard bumper system.

BRIEF DESCRIPTION OF THE SEVERAL VIEWS OF THE DRAWING

The features of this invention will be better understood from the following description, with reference to the accompanying drawings, wherein.

DETAILED DESCRIPTION OF THE INVENTION

Figure 1:
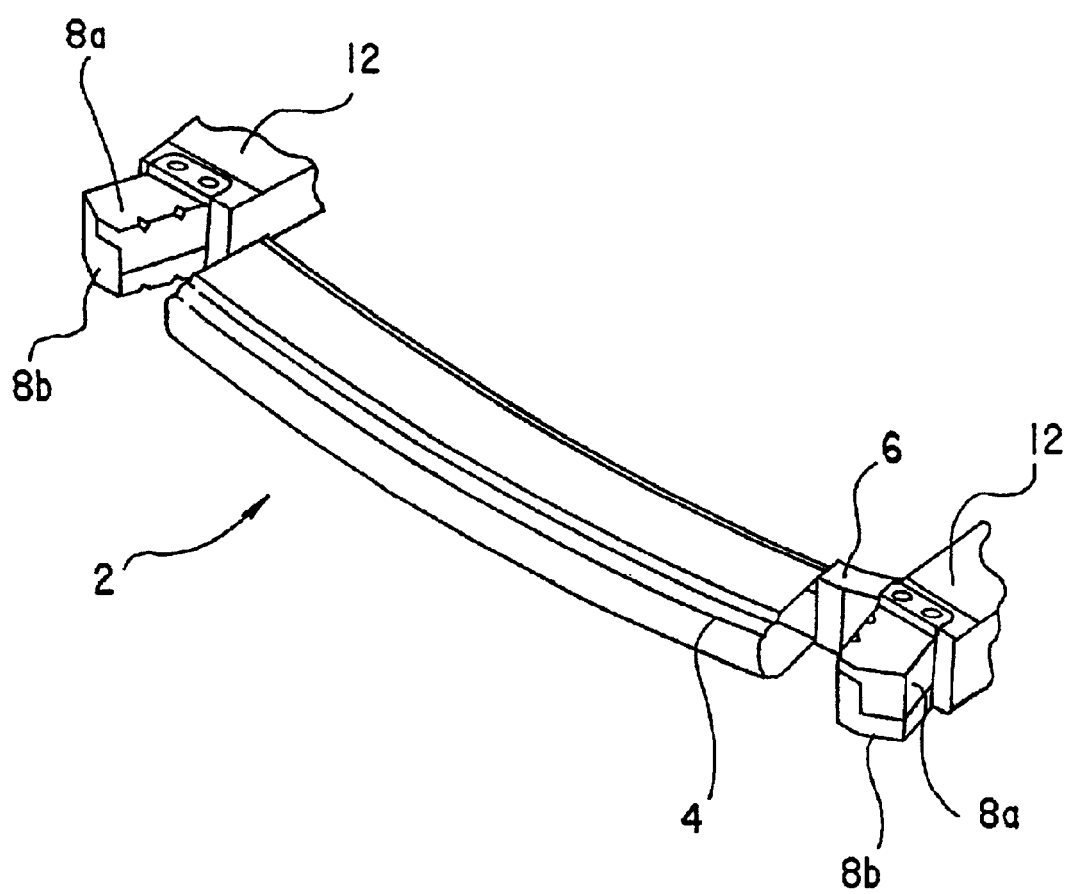
FIG. 1 illustrates the vehicle pedestrian safety bumper system of the present invention.
Figure 3:
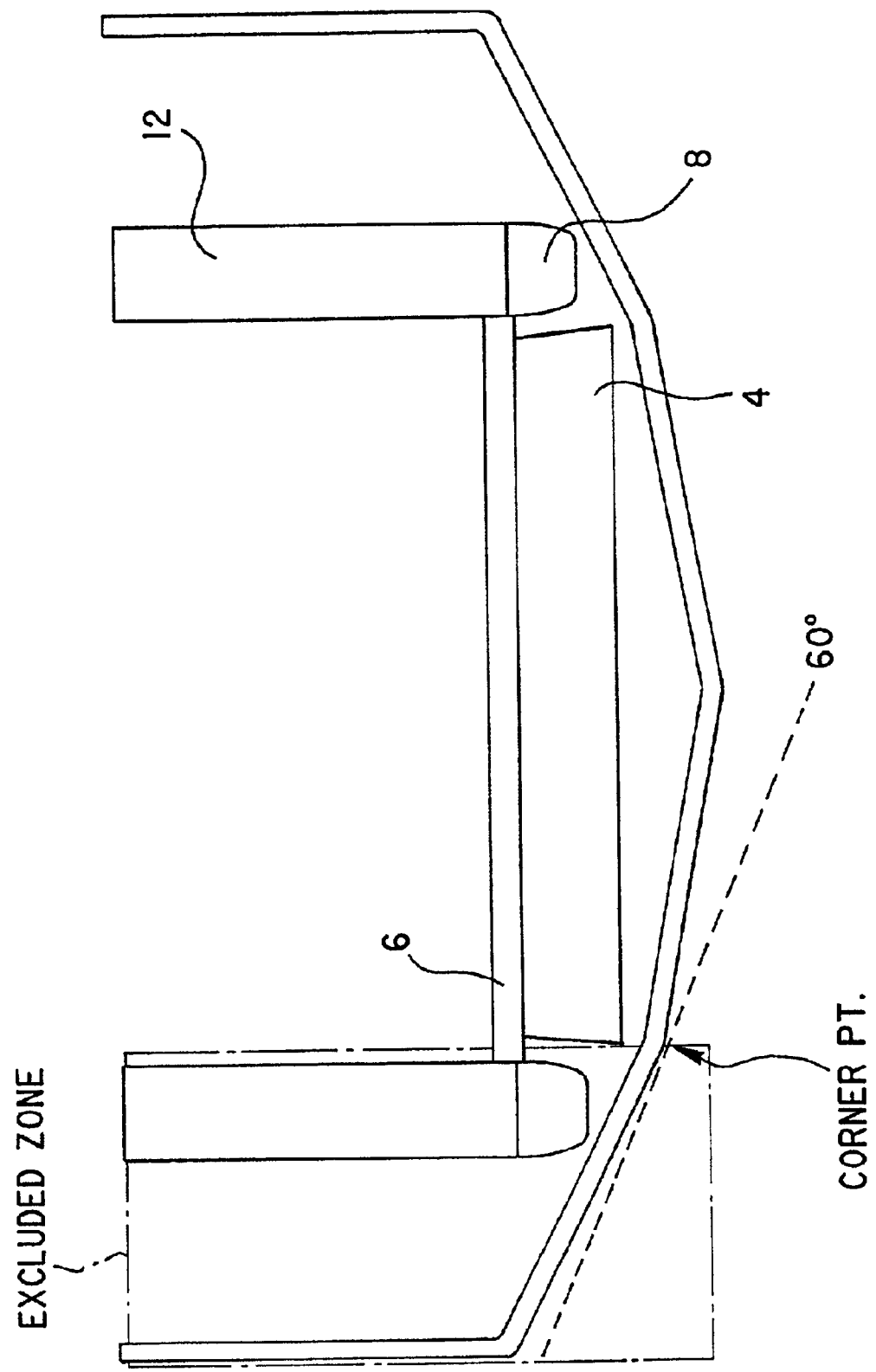
FIG. 3 illustrates a layout of the top view of the vehicle pedestrian safety bumper system.

FIGS. 1 and 3 illustrate the vehicle pedestrian safety bumper system or impact reduction vehicle bumper system of the present invention. The vehicle pedestrian safety bumper system can be mounted on any vehicle that meets the alternative upper legform test requirements. The current requirements of this test are that the vehicle provide a higher ride height, specifically, the vehicle's bumper system is preferably more than 500 mm off of the ground, but may be less. The system is intended to reduce the impact force of a vehicle on a pedestrian when the pedestrian and vehicle impact. The vehicle pedestrian safety bumper system also reduces intrusion into the vehicle when the bumper and an object impact each other at 5 mph, either when the object is a flat surface or an angled surface. The vehicle pedestrian safety bumper system can be mounted on the front frame or rear frame of a vehicle. In particular, the system can be mounted on the bumper area of the front of the vehicle. In the preferred embodiment, the bumper system is mounted on an SUV having a lower edge of the bumper fascia, which is at least 500 mm above the ground line and the fascia angle outside of the safety plate is greater than 60°. See FIG. 3.

The vehicle pedestrian safety bumper system is an impact reduction vehicle bumper system which reduces the force upon impact of an object and includes at least two frame rails 12 mounted on the vehicle body and at least two brackets 10 coupled to the at least two frame rails 12. A beam 6 is attached to the two brackets 10. A plate member 4 is attached to the beam 6, and at least two frame rail extensions 8 are coupled to brackets 10.

Figure 4:
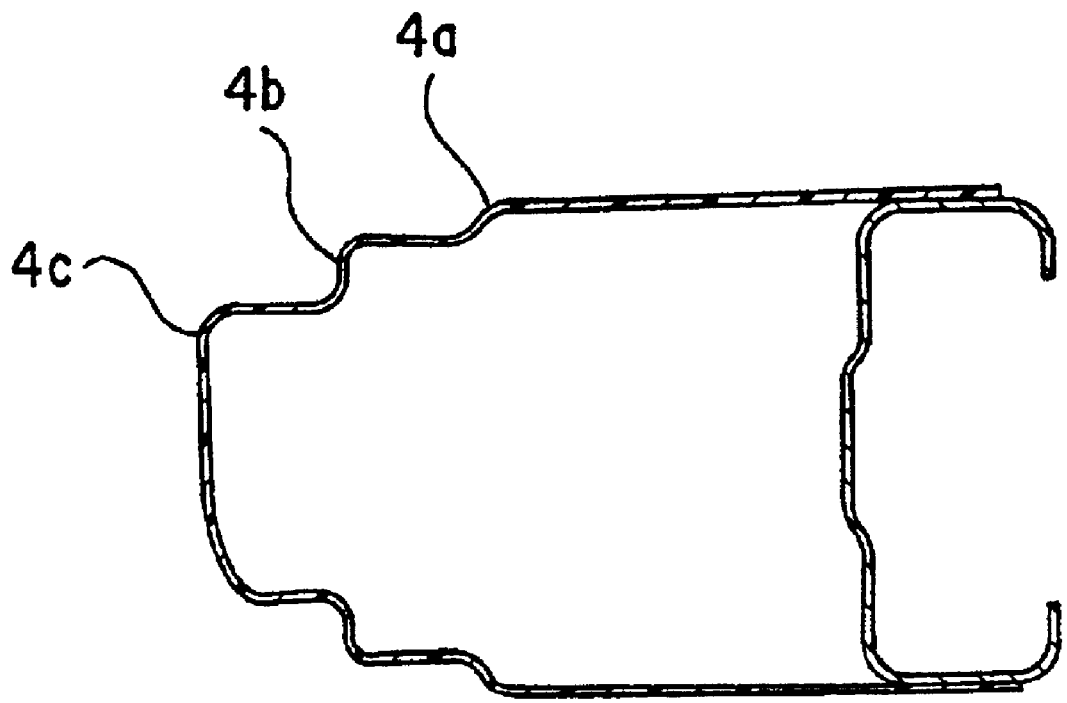
FIG. 4 illustrates a sectional view of the pedestrian safety plate taken along line 4—4 in FIG. 2.

The plate member 4 is a pedestrian safety plate, which by design and composition improves pedestrian safety in the event that a pedestrian is struck by a moving vehicle. The purpose of the pedestrian safety plate 4 is to absorb the kinetic energy of the impactor within the available space without causing a force peak above 7.5 kN. Several different types of potential constructions and materials for a pedestrian safety plate 4 were evaluated. The pedestrian safety plate 4 can be constructed of steel, plastic, and foam. In the preferred embodiment, steel offered the best combination of performance, cost and flexibility. The pedestrian safety plate is an elongated member composed of 0.65 mm thick mild steel. Mild steel is carbon steel containing 0.05–0.25% carbon. The pedestrian safety plate 4 has, in general, a U-shaped cross section and a multi-step formation, for example, a 3-step formation on the perimeter. See FIG. 4. The stepped formation of the pedestrian safety plate in FIG. 4 includes steps 4a, 4b, 4c forming a three-step concept on opposite sides of the U-shape, adjacent to the closed portion of the U-shape. The open end of the U-shaped pedestrian safety plate 4 is fitted over the beam 6 and the edges of the pedestrian safety plate are welded onto the oppositely disposed upper and lower edges of the beam 6. There is a gap between the closed end of the inner portion of the pedestrian safety plate 4 and the face of the beam 6.

Figure 2:
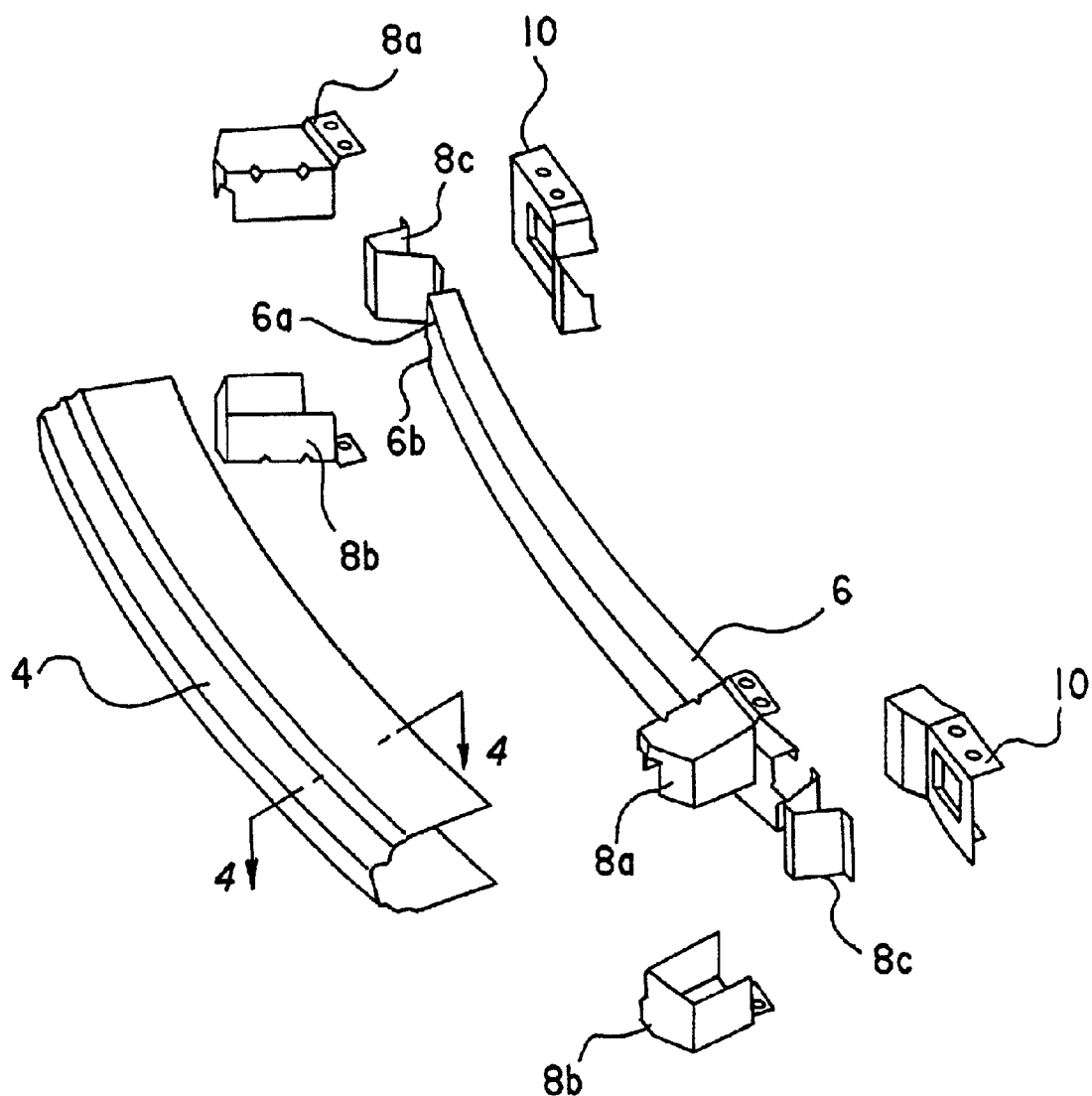
FIG. 2 illustrates an exploded view of the vehicle pedestrian safety bumper system.

The beam 6 of the present invention is a bumper beam and is shown in FIG. 2. The bumper beam 6 is an elongated member having vertically disposed upper and lower edges with a horizontal curvature or sweep therebetween. The bumper beam 6 is mounted in the vehicle pedestrian safety bumper system or impact reduction vehicle bumper system 2 and is disposed across the front of the vehicle. The bumper beam 6, also has a U-shaped cross-section and the open end of the "U" faces the vehicle. The bumper beam 6 is constructed of high strength steel having a thickness of 1.2 mm. High strength steel or high tensile steel is a low-alloy steel having a yield strength range of 50,000–100,000 pounds per square inch ($3.4 \times 10^8$ to $6.9 \times 10^8$ newtons per square meter). A plurality of stiffening beads 6a, 6b span the sweep of the bumper beam 6 in a horizontal direction and stiffen the bumper beam. The beam extends between the pair of side brackets 10 such that each end of the beam is welded to a side bracket.

The side brackets 10 support the bumper beam 6 in the vehicle pedestrian safety bumper system 2, and join the bumper beam to the frame rails 12. In particular, the side brackets 10 are U-shaped having opposite open ends such that one end of each side bracket 10 can fit and be attached to a frame rail 12 and the other end of the side bracket can fit over and be attached to the bumper beam 6. The side brackets 10 are also composed of 2.0 mm high strength steel and are bolted to the frame rails 12, and welded to the frame rail extensions 8.

The frame rail extensions 8 are disposed at the front of the frame rails 12 and serve to limit the amount of barrier intrusion for the 5 mph flat and angled impact tests. The test for the 5 mph flat and angled impacts ensures that not only is the impact reduction system pedestrian safe, but also that the integrity of the vehicle is not compromised in order to achieve the pedestrian-safe feature. The barrier intrusion test is conducted by colliding the vehicle with a flat stationary object for example, a wall, at either a 0° angle or a 30° angle from perpendicular. The frame rails 12, limit intrusion of the flat and 30° angled barriers in higher speed vehicle crashes, thereby reducing damage to the vehicle.

Figure 5:
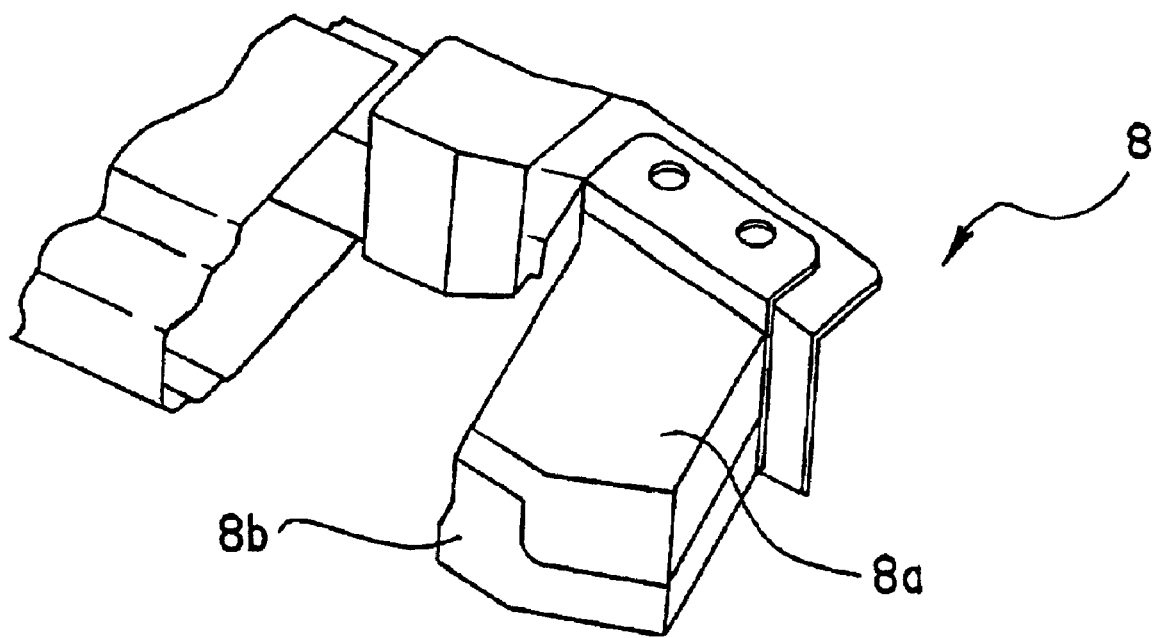
FIG. 5 illustrates the frame rail extensions of the vehicle pedestrian safety bumper system.

The frame rail extensions 8 are composed of 2.0 mm thick mild steel and, as discussed above, are welded to the brackets. Each frame rail extension 8 has three parts: an upper extension 8a, a lower extension 8b, and an inner extension 8c. The upper extension 8a and lower extension 8b form a two-part box. See FIG. 5. The box is angled outward from the center of the vehicle to align a crush axis of the frame rail extension 8 with the face of the angled barrier for both the angled barrier and flat barrier simulation.

Since the first contact of the vehicle pedestrian safety bumper system is on the 'soft' safety plate member 4, very little energy is absorbed before contact with the extensions 8. Therefore, in order to achieve a limited or reduced repair cost for the vehicle, intrusion for the flat barrier was set at less than 155 mm and for the angled barrier at less than 98 mm.

During the flat barrier testing, the two-part box was shown to meet the target performance. In order to meet the target performance for the angled barrier testing, an inner extension 8c is added. The inner extension 8c is disposed vertically between the upper 8a and lower 8b extensions. In the preferred embodiment, the inner extension 8c provides a second stage of crush strength. In particular, the inner extension 8c further limits the angled barrier intrusion without adding to the flat barrier peak floor that was created by the two-part angled box structure. Thereby, the vehicle pedestrian safety bumper system 2 is improved, while maintaining the target peak floor when the bumper system 2 and the barrier impact.

A comparison of the improvement achieved by the vehicle pedestrian safety bumper system of over the standard bumper with respect to the reduction in force peak and moment peak, and the intrusion is shown in Table 1 and Table 2 respectively.

TABLE 1

Results of upper legform pedestrian testing

| Test Description | Peak Force Total (N) | Peak Moment | | |
|---|---|---|---|---|
| | | Upper (N-m) | Center (N-m) | Lower (N-m) |
| Targets | <7500 | <510 | <510 | <510 |
| Standard SUV (Center) | 26090.1 | 949.1 | 1518.9 | 1685.7 |
| Pedestrian SUV (Center) | 5495.9 | 224.3 | 326.2 | 374.4 |
| Pedestrian SUV | 4704.5 | 265.4 | 334.8 | 324.7 |

TABLE 1-continued

Results of upper legform pedestrian testing

| Test Description | Peak Force Total (N) | Peak Moment | | |
|---|---|---|---|---|
| | | Upper (N-m) | Center (N-m) | Lower (N-m) |
| (Off-center) Pedestrian SUV (Edge) | 5186.2 | 284.9 | 363.9 | 365.9 |

TABLE 2

Results of low speed barrier testing

| Bumper System | 5 mph Flat | | 5 mph R30° | |
|---|---|---|---|---|
| | Peak Floor G | Intrusion (mm) | Peak Floor G | Intrusion (mm) |
| Targets | NA | <155 | NA | <98 |
| Standard SUV | 5.7 | 110 | 5.1 | 90 |
| Pedestrian SUV | 8.2 | 130 | 4.4 | 67 |

According to the arrangement of the vehicle pedestrian safety bumper system or impact reduction system 2 of the present invention, an impact reduction zone is created. Forming the impact reduction zone on the SUV requires mounting at least two frame rails 12 on a vehicle body to provide a secure base for the impact reduction system. Securing at least two brackets 10 to the two frame rails 12 provides additional structure for the attachment of the bumper beam 6. Providing the plate member or pedestrian safety plate 4 on the bumper beam 6 allows the impact reduction system 2 to meet the requirements for the alternative upper legform impactor to bumper test. As discussed above, this test is used to simulate the impact of a pedestrian's leg with a vehicle bumper in order to test the force between a pedestrian and the vehicle bumper. Coupling at least two frame rail extensions 8 to the brackets 10 limits the amount of barrier intrusion for 5 mph flat and angled impacts. The arrangement of the vehicle pedestrian safety bumper system provides an impact force reduction zone.

In the preferred embodiment described above, the vehicle pedestrian safety bumper system is mounted on an SUV. The bumper system may also be mounted on various other types of vehicles such as cars, vans and trucks, provided that these vehicle meet the alternative upper legform test requirements.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. An impact reduction vehicle bumper system, comprising:
   at least two frame rails;
   at least two brackets coupled respectively to the at least two frame rails;
   a beam attached to the at least two brackets;
   a plate member attached to the beam; and
   at least two frame rail extensions coupled to the at least two brackets,
   wherein each bracket of the at least two brackets is disposed between and directly connected to a first longitudinal end face of a corresponding frame rail of the at least two frame rails and either one of a first longitudinal end face and a second longitudinal end face of the beam,
   wherein the first and second longitudinal end faces of the beam are parallel relative to a longitudinal axis of each frame rail extension and the first longitudinal end face of each frame rail is orthogonal relative to the longitudinal axis of each frame rail, and
   wherein each frame rail extension includes a first end face and a second end face opposite the first end face relative to a direction defined by the longitudinal axis of the frame rail extension, the first end face being coupled to a corresponding bracket and the second end face being disposed forward of a longitudinal front face of the beam.

2. The impact reduction vehicle bumper system according to claim 1, wherein the plate member is composed of steel and is welded to the beam.

3. The impact reduction vehicle bumper system according to claim 1, wherein the beam and brackets are composed of steel and the beam is welded to the brackets.

4. The impact reduction vehicle bumper system according to claim 1, wherein the frame rail extensions are composed of a steel and are welded to the brackets.

5. The impact reduction vehicle bumper system according to claim 4, wherein the brackets are side brackets.

6. The impact reduction vehicle bumper system according to claim 1, wherein the plate member has a U-shaped cross-section.

7. The impact reduction vehicle bumper system according to claim 6, wherein the plate member has a multi-step U-shaped cross-section.

8. The impact reduction vehicle bumper system according to claim 7, wherein the multi-step U-shaped cross-section is a three-step U-shaped cross-section.

9. The impact reduction vehicle bumper system according to claim 1, wherein the at least two frame rail extensions include an upper extension, a lower extension and an inner extension.

10. The impact reduction vehicle bumper system according to claim 9, wherein the upper and lower extensions form an angled box and the inner extension is disposed between the upper and lower extensions.

11. The impact reduction vehicle bumper system according to claim 1, wherein the plate member absorbs kinetic energy during a collision without causing a peak force greater than 7.5 kN.

12. The impact reduction vehicle bumper system according to claim, wherein the plate member absorbs kinetic energy during a collision without causing a peak moment greater than 510 Nm.

13. The impact reduction vehicle bumper system according to claim 1, wherein the impact reduction system is a vehicle front bumper.

14. The impact reduction vehicle bumper system according to claim 13, wherein the vehicle front bumper is mountable on a vehicle.

15. An impact reduction vehicle bumper system, comprising:
   at least two frame rails;

at least two brackets coupled respectively to the at least two frame rails;

a beam attached to the at least two brackets;

a plate member attached to the beam; and at least two frame rail extensions coupled to the at least two brackets, wherein the at least two frame rail extensions include an upper extension, a lower extension and an inner extension, wherein each bracket of the at least two brackets is disposed between and directly connected to a first longitudinal end face of a corresponding frame rail of the at least two frame rails and either one of a first longitudinal end face and a second longitudinal end face of the beam, and wherein the first and second longitudinal end faces of the beam are parallel relative to a longitudinal axis of each frame rail extension and the first longitudinal end face of each frame rail is orthogonal relative to the longitudinal axis of each frame rail.

16. The impact reduction vehicle bumper system according to claim 15, wherein the plate member is composed of steel and is welded to the beam.

17. The impact reduction vehicle bumper system according to claim 15, wherein the beam and brackets are composed of steel and the beam is welded to the brackets.

18. The impact reduction vehicle bumper system according to claim 15, wherein the frame rail extensions are composed of a steel and are welded to the brackets.

19. The impact reduction vehicle bumper system according to claim 18, wherein the brackets are side brackets.

20. The impact reduction vehicle bumper system according to claim 15, wherein the plate member has a U-shaped cross-section.

21. The impact reduction vehicle bumper system according to claim 20, wherein the plate member has a multi-step U-shaped cross-section.

22. The impact reduction vehicle bumper system according to claim 21, wherein the multi-step U-shaped cross-section is a three-step U-shaped cross-section.

23. The impact reduction vehicle bumper system according to claim 15, wherein the upper and lower extensions form an angled box and the inner extension is disposed between the upper and lower extensions.

24. The impact reduction vehicle bumper system according to claim 15, wherein the plate member absorbs kinetic energy during a collision without causing a peak force greater than 7.5 kN.

25. The impact reduction vehicle bumper system according to claim 15, wherein the plate member absorbs kinetic energy during a collision without causing a peak moment greater than 510 Nm.

26. The impact reduction vehicle bumper system according to claim 15, wherein the impact reduction system is a vehicle front bumper.

27. The impact reduction vehicle bumper system according to claim 26, wherein the vehicle front bumper is mountable on a vehicle.

* * * * *